(12) United States Patent
Aronoff et al.

(10) Patent No.: US 11,210,556 B2
(45) Date of Patent: Dec. 28, 2021

(54) CLASSIFICATION OF RECORDS IN A DATA SET

(71) Applicant: Hewlett-Packard Development Company, L.P., Spring, TX (US)

(72) Inventors: Jason S. Aronoff, Fort Collins, CO (US); Steven J. Simske, Ft. Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/769,766

(22) PCT Filed: Jan. 25, 2018

(86) PCT No.: PCT/US2018/015240
§ 371 (c)(1),
(2) Date: Jun. 4, 2020

(87) PCT Pub. No.: WO2019/147245
PCT Pub. Date: Aug. 1, 2019

(65) Prior Publication Data
US 2020/0394454 A1    Dec. 17, 2020

(51) Int. Cl.
*G06K 9/62* (2006.01)
*G06K 9/00* (2006.01)
*G06K 9/34* (2006.01)

(52) U.S. Cl.
CPC ....... *G06K 9/6231* (2013.01); *G06K 9/00073* (2013.01); *G06K 9/00093* (2013.01); *G06K 9/344* (2013.01); *G06K 9/6215* (2013.01)

(58) Field of Classification Search
CPC ............. G06K 9/6231; G06K 9/00073; G06K 9/00093; G06K 9/344; G06K 9/6215
See application file for complete search history.

(56) References Cited

U.S. PATENT DOCUMENTS

| | | | |
|---|---|---|---|
| 5,838,306 A | * | 11/1998 | O'Connor ............... G06F 21/32 345/163 |
| 7,152,060 B2 | | 12/2006 | Borthwick et al. |
| 8,712,157 B2 | | 4/2014 | Marchesotti et al. |
| 2003/0039381 A1 | | 2/2003 | Ziesig |
| 2003/0169910 A1 | | 9/2003 | Reisman et al. |
| 2005/0129293 A1 | | 6/2005 | Acharya et al. |
| 2007/0248249 A1 | * | 10/2007 | Stoianov ........... G06K 9/00087 382/124 |

(Continued)

FOREIGN PATENT DOCUMENTS

EP        0779595       6/1997

*Primary Examiner* — David F Dunphy
(74) *Attorney, Agent, or Firm* — Phillips Winchester, LLC (57) ABSTRACT

Techniques for classifying records in a dataset are described. The method includes identifying a set of features of a target record and assigning a scoring metric to each feature in the set of features. The method also includes processing the set of features based on the scoring metric to obtain a reduced subset of features and an expanded subset of features. The method also includes searching a store of electronic records using the reduced subset of features to obtain a reduced subset of electronic records. The method also includes searching the reduced subset of electronic records using the expanded subset of features to obtain a set of matching electronic records.

15 Claims, 6 Drawing Sheets

(56) References Cited

U.S. PATENT DOCUMENTS

| | | | |
|---|---|---|---|
| 2011/0035656 A1* | 2/2011 | King | H04N 1/00782 |
| | | | 715/234 |
| 2015/0095349 A1 | 4/2015 | Sturzolu et al. | |
| 2016/0378806 A1* | 12/2016 | Hopcroft | G06F 16/93 |
| | | | 707/715 |
| 2017/0091526 A1 | 3/2017 | Archibald et al. | |
| 2017/0262691 A1* | 9/2017 | Kuda | G06K 9/6807 |

* cited by examiner

FIG. 6

CLASSIFICATION OF RECORDS IN A DATA SET

BACKGROUND

Computerized processes for searching and classifying large data sets can use a large amount of computing resources and take considerable time to process. For example, a typical fingerprint database may include several millions of fingerprints. Searching such a database may take several hours.

DESCRIPTION OF THE DRAWINGS

Certain examples are described in the following detailed description and in reference to the drawings, in which.

DETAILED DESCRIPTION

The present disclosure describes techniques for searching a set of candidate records to obtain potential matches to a target record. The term record is used to describe any form of electronically stored data including fingerprints, text documents, images files, etc. The exemplary method is applied to fingerprint matching, but can also be used in other pattern matching contexts, such as document retrieval, image matching, facial recognition, iris matching, and others.

Each record (e.g. fingerprint) includes a set of features (e.g., minutiae). To identify records that are considered a match for a target record, the features in the target record are compared to the features in the set of candidate records to be searched. To reduce computational overhead and search time, the matching technique uses two sub-processes, referred to as the "parsimonious" search and the "greedy" search. Prior to the parsimonious search, each feature in the target record is assigned an individual scoring metric. The parsimonious search uses only a subset of features that are obtained based on a scoring metric. The result of the parsimonious search is a reduced subset of records to be further searched. The greedy search then searches the reduced subset of records using most or all of the features regardless of their score metric.

Figure 1:
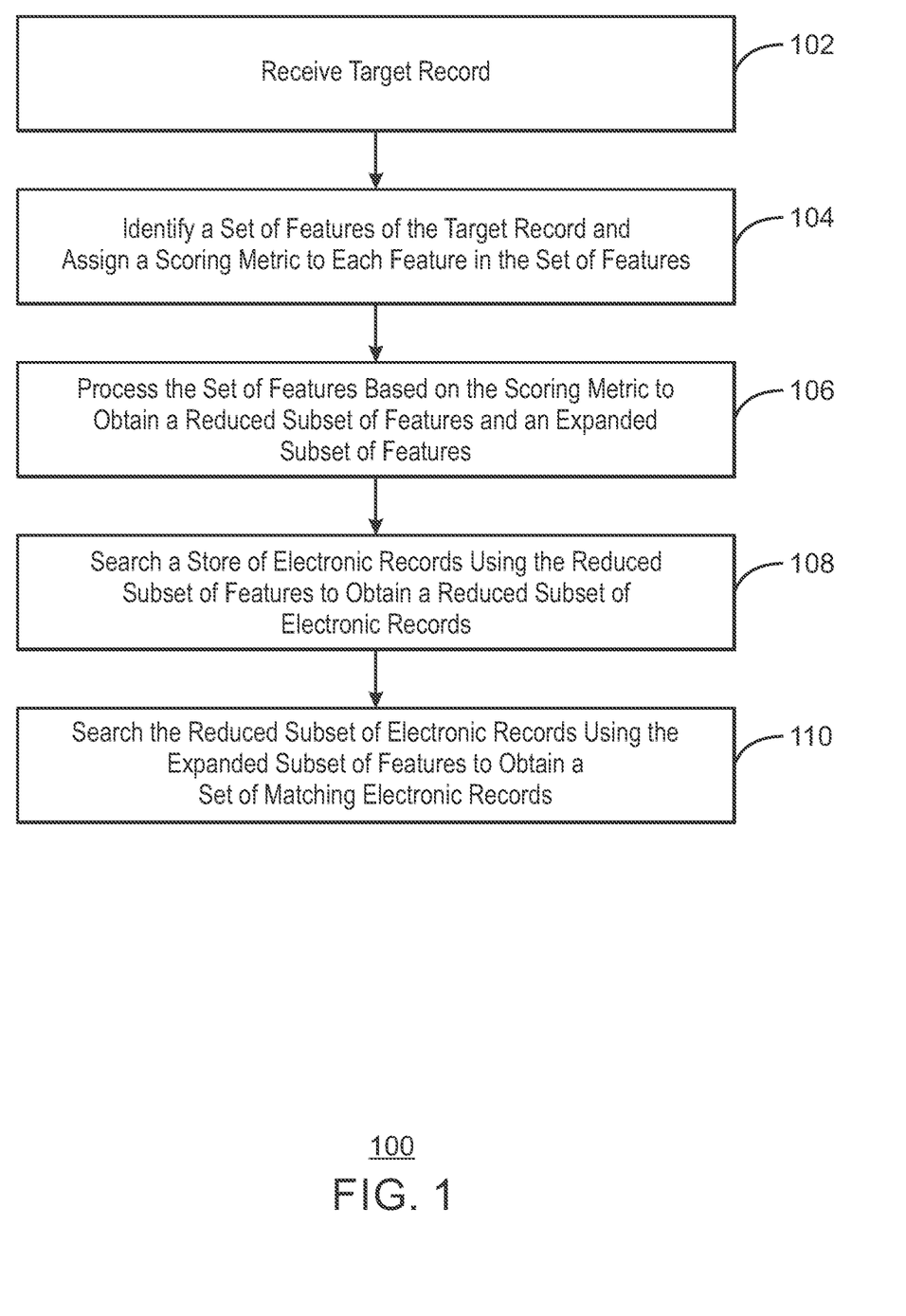
FIG. 1 is a process flow diagram of a method of identifying matching records in a data set.

FIG. 1 is a process flow diagram of a method of identifying matching records in a data set. The method 100 may be used to search a store of candidate records to obtain records that match a target record. As used herein, the term "matching record" is used to describe a candidate record that has a high probability of being closely related to the target record. Thus, a matching record is not necessarily an identical match to the target record. For example, in the context of fingerprint matching, the matching records will be candidate fingerprints that have a high probability of originating from the same finger as the target fingerprint. In the context of text documents, the matching record may be a candidate text document that has a high degree of textual similarity with the target text document. The method 100 may be performed by the system shown in FIG. 5. The method 100 may start at block 102.

At block 102, a target record may be received. The target record may be a record selected by a user to initiate a search. In some examples, the target record is received from a biometric measuring device such as a fingerprint scanner, iris scanner, image capture device, and others. The target record may be a fingerprint, a text document, an image, and others.

At block 104, the target record is processed to identify a set of features. The features may be any characteristics of the target record. If the records are fingerprints, the features are minutiae within the fingerprint, such as bifurcations and ridge endings. If the records are text documents, the features may be words or phrases appearing in the document.

Each identified feature is also assigned an individual scoring metric. The scoring metric is a measure of how reliable or representative each individual feature is. In some examples, the scoring metric is a quality score, which describes the quality of the corresponding metric. For fingerprints, the quality score may represent the sharpness or clarity of the feature. For example, well-defined minutiae will generally receive a higher quality score compared to minutiae that are lightly imprinted, smudged, or in a portion of the fingerprint that is otherwise less well-defined. For images, the quality score may be higher for portions of the image that are in focus compared to portions of the image that are out of focus. Other characteristics relating to quality of the feature may also be included in the quality score. In text documents, the scoring metric may be a measure of the number of times that a word or phrase appears in the document or a measure of the uniqueness of a word or phrase.

At block 106, the set of features is processed based on the scoring metric to obtain a reduced subset of features and an expanded subset of features. The reduced subset of features is used in the parsimonious search. The reduced subset of features may be obtained by filtering out features with a low scoring metric. For example, the reduced subset of features may include all features with a scoring metric above a threshold value. In some examples, the reduced subset of features may include a specified number of features with the highest scoring metric.

The expanded subset of features can include most or all of the features identified for the record at block 104. In some examples, the expanded subset of features includes all of the features identified at block 104, in which case the expanded set of features will be identical to the set of features identified at block 104. In some examples, the expanded subset of features may include all features except those with a scoring metric below a threshold value, which may be specified to eliminate very low quality features. In some examples, the expanded subset of features includes a specified number of features with the highest scoring metric.

At block 108, a store of electronic records is searched using the reduced subset of features. This search is the parsimonious search referred to above. The result of this search is a reduced subset of the electronic records. The reduced subset represents those records that have a possibility of being a match for the target record. In this way, the search space is reduced for the more comprehensive greedy search.

At block 110, the reduced subset of electronic records is searched using the expanded subset of features to obtain a set of matching electronic records. This search is the greedy search referred to above. The matching records may be identified and presented to a user for further inspection. For example, in the case of fingerprints, the matching fingerprints may be presented to a fingerprint analysis expert to determine whether any of the matching fingerprints are actual matches to the target fingerprint. In the case of text documents, the matching text documents may be presented to a user to determine whether the matching document is similar enough to suggest that the matching document was a source for the target document. This may be useful, for example, to identify plagiarism or to identify an earlier version of the target document.

The process flow diagram of FIG. 1 is not intended to indicate that the method is to include all of the blocks shown. Further, the method may include any number of additional blocks not shown in FIG. 1, depending on the details of the specific implementation.

Figure 2A:
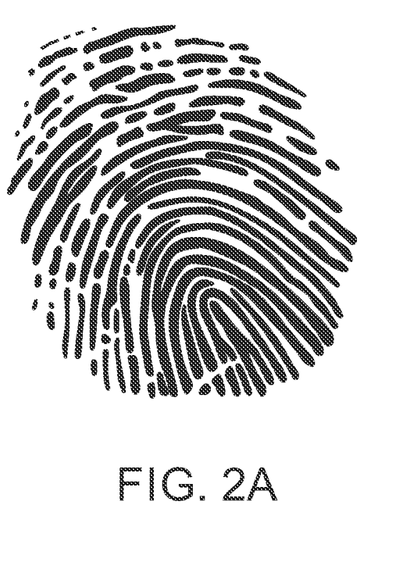
FIGS. 2A and 2B depict two sample fingerprints of varying quality.
Figure 2B:
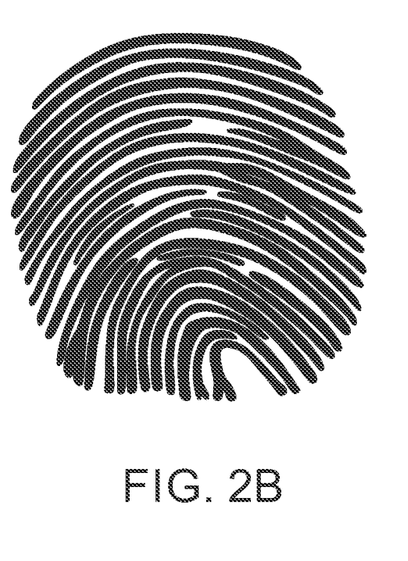

FIGS. 2A and 2B depict two sample fingerprints of varying quality. The left portion of the print shown in FIG. 2A contains ridgelines of varying intensity due to a dry or damaged fingertip. In contrast, FIG. 2B depicts a fingerprint with fairly uniform ridgelines with minimal breaks. Extraction of minutiae in FIG. 2A is more challenging and some minutiae may go undetected due to the poorly imaged ridgelines. Additionally, breaks in the ridgelines due solely to the quality of the image may be misinterpreted as ridge ending minutiae when in fact they are merely image artifacts. In contrast, the quality of the fingerprint in FIG. 2B allows for higher confidence in the minutiae extracted from the image. During the minutiae extraction process, a quality score is assigned to each of the detected minutiae based on local and/or global image quality properties. For example, the quality score may be based on the color intensity of the ridgelines surrounding the minutiae. Thus, those minutiae in the left portion of the print shown in FIG. 2A will be expected to have a lower quality score compared to other minutiae within the fingerprint.

Table 1 lists an example of minutiae extracted from two different fingerprints to provide an example of how the parsimonious and greedy methods would incorporate minutiae from these two fingerprints. For the sake of this disclosure, the quality of a minutia is scored on a scale from 1 to 10 with 1 being lowest and 10 being highest quality or confidence. In the table below, the x and y columns describe the rectangular coordinates for each minutia and the quality score describes the corresponding quality score assigned to the minutia.

TABLE 1

Features extracted from sample fingerprints.

| Fingerprint 1 | | | Fingerprint 2 | | |
|---|---|---|---|---|---|
| X | Y | Quality Score | X | Y | Quality Score |
| 7 | 20 | 9 | 8 | 21 | 8 |
| 15 | 32 | 8 | 21 | 31 | 8 |
| 27 | 40 | 9 | 29 | 71 | 9 |
| 29 | 45 | 3 | 44 | 56 | 3 |
| 44 | 17 | 8 | 61 | 47 | 7 |
| 57 | 66 | 4 | 35 | 19 | 2 |
| 33 | 50 | 3 | 80 | 57 | 1 |

Looking at the quality scores for the extracted minutiae listed in Table 1, if the cutoff for quality is set to 8 and above, then the parsimonious approach would utilize four minutiae points for fingerprint 1 and three minutiae points for fingerprint 2. On the other hand, the greedy approach may use all the minutiae points in each fingerprint. Note that this example is merely used to illustrate the techniques disclosed herein. In real world cases, many more minutiae would typically be extracted from full fingerprints.

A number of different approaches that may be taken to match fingerprints using minutiae, including a simple point by point comparison. In this approach, after the target fingerprint image has been aligned to a candidate fingerprint image, scoring occurs by comparing the number of points that approximately overlay each other in the aligned images. Due to the fact that finger tips deform under pressure, it may not be possible to have an exact positional match on each minutia point. A common method to address this issue is to allow a certain amount of distance offset in comparing points, for example 10 microns. Then, if two minutia points are within this tolerance they are considered matching points, i.e. the same minutia point. As one can readily expect, two fingerprints from different fingers will not align well over each other and the number of minutiae matches will be low. The fingerprint matching method may also incorporate other quantitative descriptive measures such as orientation, nearby ridge frequency, type of minutia point, etc. These additional descriptive measures provide greater discriminating power when comparing minutiae.

Figure 3:
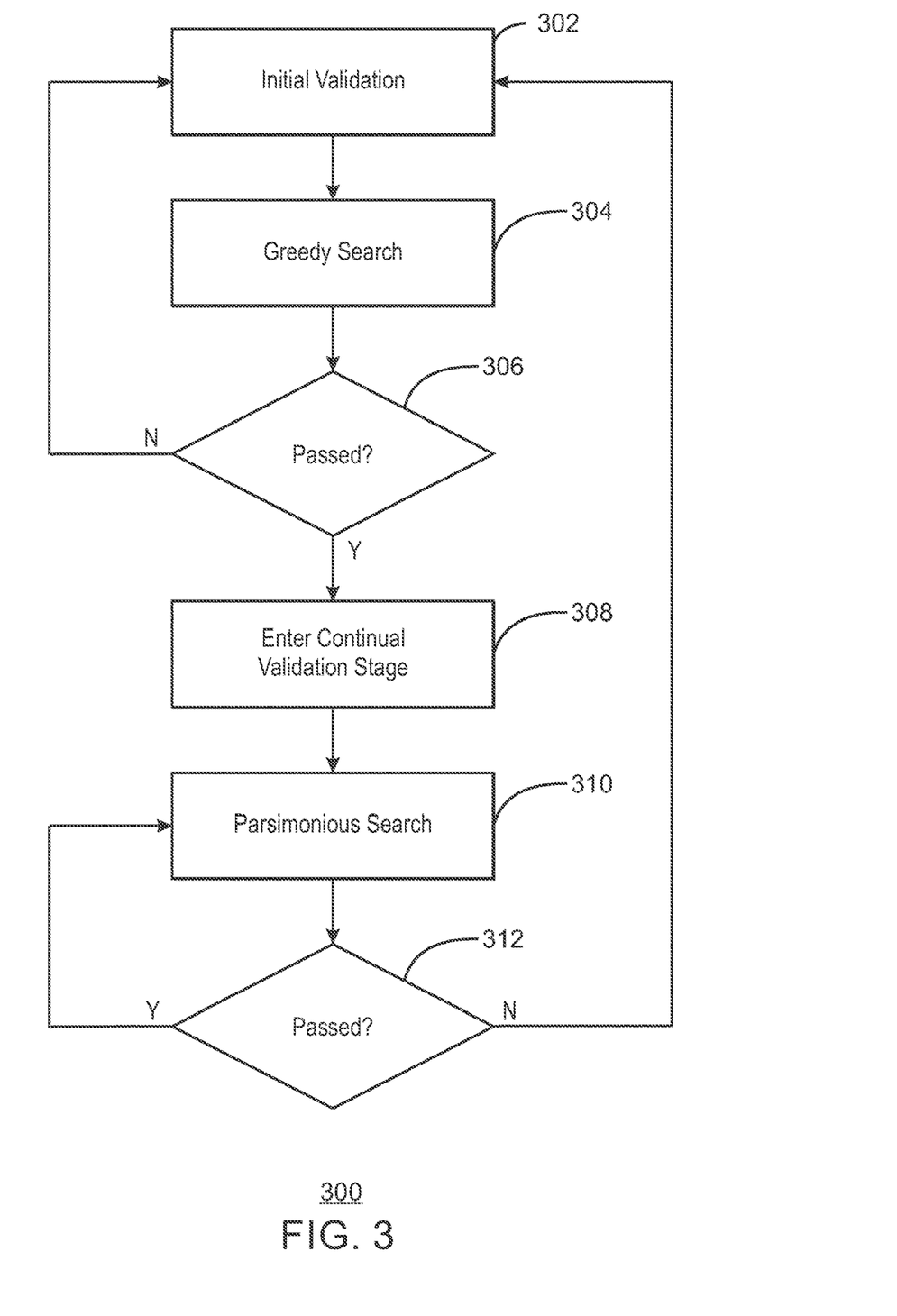
FIG. 3 is a process flow diagram of a method of performing identity validation.

FIG. 3 is a process flow diagram of a method of performing identity validation. The method may be performed by one or more components of the system shown in FIG. 5. The method may be performed to log into a personal computer, smart phone, a computer network, and the like. The method may begin at block 302.

At block 302, an initial validation process starts. The initial validation process may begin by a person providing log-in credentials at a log-in interface. The log-in credentials may include biometric information, such as a fingerprint, or an iris scan, for example. The log-in credentials may also include additional information such as a password. The initial validation process may be started in response to receiving biometric information from a biometric measuring device such as a fingerprint scanner, iris scanner, image capture device, keyboard, and others. The log-in credentials are used as the target record for searching one or more candidate records.

At block 304, a greedy search is performed, which determines whether the initial validation is successful. To begin the greedy search, the target record is processed to identify a set of features, such as minutiae. Then, the candidate records are searched using most or all of the identified features. The candidate records may be corresponding records (fingerprints, iris scans, etc.) of people that are able to access the computer system in question. For example, the candidate records may be the employees of a company who have permission to access the company's computer network. If a matching record is identified among the candidate records, then the validation is considered successful.

At block 306, if the validation is not successful, the process flow may return to block 302. If the validation is successful, the process flow may advance to block 308.

At block 308, the continual validation stage begins. The continual validation stage is performed to ensure that the user validation continues to be authentic. For example, the user could momentarily walk away from the computer system without logging off, which would enable another person to gain access inappropriately. The purpose of the continual validation stage is to ensure that this can't happen.

At block 310, a parsimonious search is conducted. The parsimonious search uses a subset of biometrics for identity verification. Additionally, the parsimonious search can use a different set of biometric input as compared to the greedy search. For example, rather than using a fingerprint, the biometric inputs for the parsimonious search may include patterns of behavior that may be associated with a particular individual, such as keystroke frequency, voice recognition, face recognition, iris recognition, and others.

At block 312, if the validation is successful, the process flow may return to block 310, and the continual validation process continues. Through the continual validation process, the user continues to have access to the computer system. If the validation is unsuccessful, the process flow may return to block 302. At block 302, the user may be requested to provide additional credentials, such as a new fingerprint and/or password for example.

The process flow diagram of FIG. 3 is not intended to indicate that the method is to include all of the blocks shown. Further, the method may include any number of additional blocks not shown in FIG. 3, depending on the details of the specific implementation.

Figure 4:
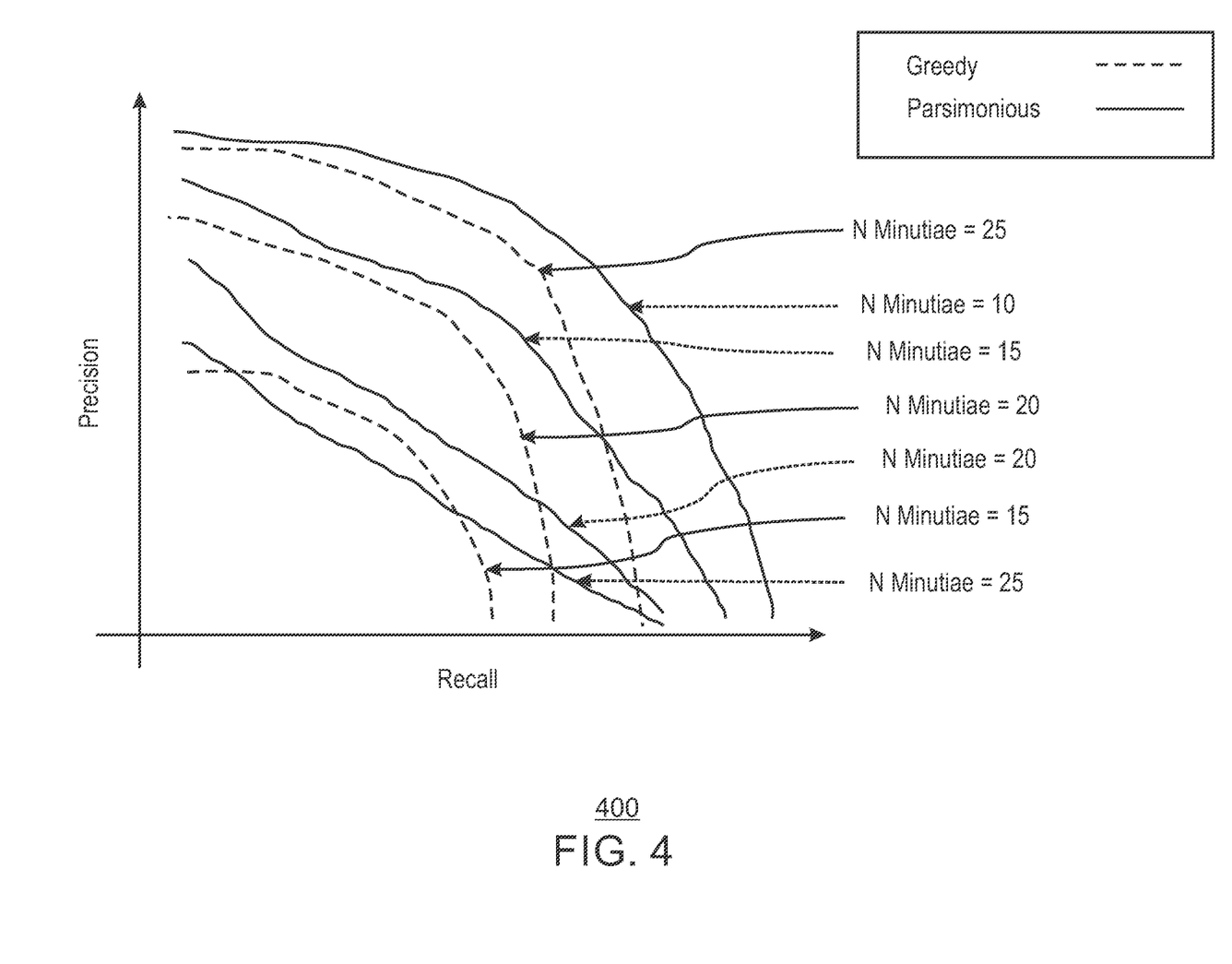
FIG. 4 is a graph showing how the greedy and parsimonious methods can be used as a tuning parameter.

FIG. 4 is a graph showing how the greedy and parsimonious methods can be used as a tuning parameter. The graph in FIG. 4 depicts the precision and recall results from multiple runs of a system. For example, a single run of the system may be a search as described in relation to FIG. 1.

Each curve in the graph represents one result of a system for a given set of parameters. The dotted lines represent the precision-recall curve for parsimonious searches, and the solid lines represent the precision-recall curve for greedy searches. Each curves may be obtained by varying the parameters of the search. For example, the varied parameter may be a margin (x,y, angle) in the placement of fingerprint minutiae.

As demonstrated by the graph, the parsimonious and greedy approaches produce different outcomes not only compared to each other, but also when adjusting the number of minutiae used to perform the search. Through repeated runs a system can be profiled to identify the tuning parameters associated with a precision-recall curve that best fits a given application. The decision as to when to provide a parsimonious approach, a greedy approach, or a weighted combination of the two approaches, can be determined by inspection or automatically for the domain. In the case of the latter, automated methods may use metrics, heuristics or other quantitative measurements to determine when to switch or change weightings of the approaches. For example, with regard to the search process described in FIG. 1, the number of features used in the parsimonious search may be adjusted to obtain desired performance results, e.g., to improve the speed of the search while maintaining a desired recall and precision attributes.

Figure 5:
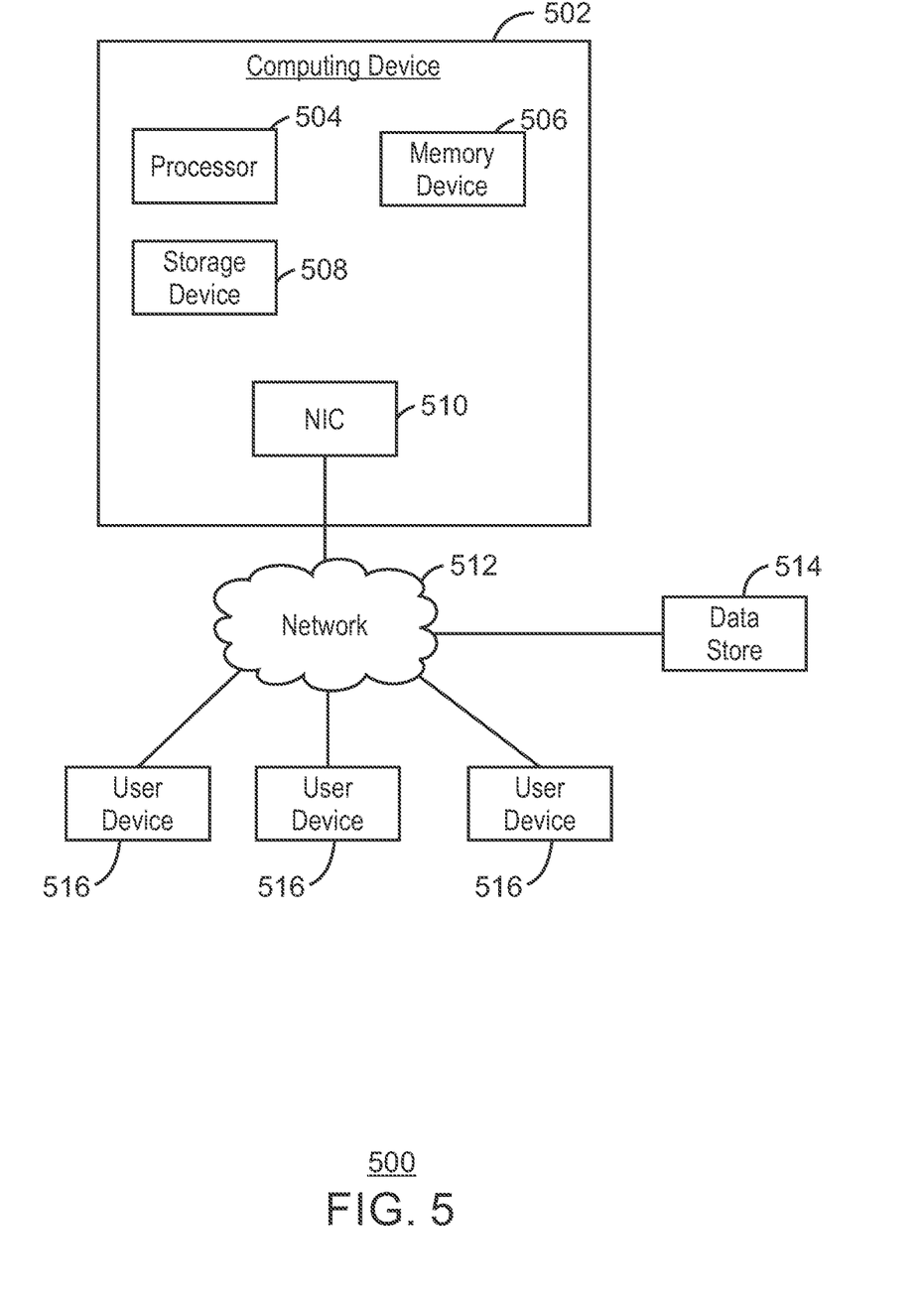
FIG. 5 is a block diagram of a system configured to identify matching records in a data set.

FIG. 5 is a block diagram of a system configured to identify matching records in a data set. The system may be configured to search a store of candidate records as described in relation to FIG. 1 and/or perform identify validation as described in relation to FIG. 3.

The system 500 includes one or more computing devices 504, which may be personal computers, servers, and the like. The computing device 504 includes a central processing unit (CPU) 504 for executing stored instructions. The CPU 504 may be more than one processor, and each processor may have more than one core. The CPU 504 may be a single core processor, a multi-core processor, a computing cluster, or other configurations. The CPU 504 may be a microprocessor, a processor emulated on programmable hardware, e.g. FPGA, or other type of hardware processor. The CPU 504 may be implemented as a complex instruction set computer (CISC) processor, a reduced instruction set computer (RISC) processor, an x86 instruction set compatible processor, or other microprocessor or processor.

The computing device 502 also includes a memory device 506 that stores instructions that are executable by the CPU 504. The memory device 506 may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory system. The memory device 506 can be used to store data and computer-readable instructions that, when executed by the processor 504, direct the processor 504 to perform various operations in accordance with embodiments described herein.

The computing device 502 may also include a storage device 508. The storage device 508 may be a physical memory device such as a hard drive, an optical drive, a flash drive, an array of drives, or any combinations thereof. The storage device 508 may store data as well as programming code such as device drivers, software applications, operating systems, and the like. The programming code stored by the storage device 508 may be executed by the CPU 504.

The computing device 502 may further include a network interface controller (NIC) 510 to provide a wired communication to a network 512. The network 512 may be a private network such as a corporate network or a public network such as the Internet. The network 512 may be in communication with a data storage device 514, such as a database or network of hard drives, for example. The computing device 502 may also communicate through the network 512 with a number of user devices 516, such personal computers, laptops, smart phones, and others.

The system 500 may be configured to perform a search as described in relation to FIG. 1. The data storage device 508 or the data storage device 514 may store a large body of candidate records to be searched. The data storage device 508 and/or the data storage device 514 may also store a number of target records, which may be selected by the user to initiate search. As mentioned above, the target record and candidate records may be biometric records, such as fingerprints or iris scans, text documents, images, and others.

In some examples, the search is performed by the computing device 502 and may be initiated by a user through one of the user devices 516. A user may initiate a search of the candidate records by selecting a target record stored to the data storage device 508 or the data storage device 514. Additionally, the target record may be provided to the computing device 502 by one of the user devices 516. For example, if the target record is an image such a facial image or an image of an iris, the image may be captured by a camera included in one of the user devices 516. If the target record is a fingerprint, the fingerprint may be scanned by a fingerprint scanner included in one of the user devices 516. Various other possibilities for capturing or identifying a target record and initiating a search are also possible.

The system 500 may also be configured to perform identity verification as described in relation to FIG. 3. In this case, candidate records stored to the data storage device 508 and/or the data storage device 514 may include information used to verify login credentials, including passwords, biometric data, and other information used to verify a user's identity. In some examples, the identify verification may be performed to enable a user at a user device to access resources coupled to the network, such as the computing device 502 or the data storage device 514.

The identity verification may be integrated and linked across all platforms for which a user has an account. For example, the user devices 516 may be various devices in the possession of a single, such as a laptop, a smartphone, a tablet, and a second PC. Additionally, the user may have access to various systems on the network 512. Linking access across all of these various devices enables the user to login to one device and establish access to one or more additional devices. To provide such linking, the authentication settings for a specific user can track over the network to the next device owned by that person. This provides a customized authentication means tailored to a specific person and the device for which they are attempting to access.

The parsimonious and greedy searches are used to analyze biometric data from the multiple platforms and provide a way for the user to transition from one device to another in the same session. For example, as described in relation to FIG. 3, when a user first logs into a system, the authentication process may require a full (i.e. greedy match). While the user interacts with the system a continual authentication protocol may be required to ensure the identity of the person interacting with the system is the same person that logged into the system. The continual authentication approach may only require a subset of biometrics for identity verification (i.e. the parsimonious approach). In this context, as long as the user continuously authenticates successfully, only the parsimonious set of data are required. If an authentication error occurs the system may fall back to requiring a more thorough authentication verification via the greedy approach (i.e. requiring a more detailed examination of the full user biometric set). The switch between parsimonious and greedy algorithm can also involve a switch in data set for comparison. When the user passes the full (greedy) authentication the system switches back to the reduced subset of biometric features. As mentioned above, this may also apply when a user transitions across devices. The approach may be applied in either order depending on the context and security requirements of the situation.

The block diagram of FIG. 5 is not intended to indicate that the system is to include all of the components shown. Rather, the system can include fewer or additional components not shown in FIG. 5, depending on the details of the specific implementation.

Figure 6:
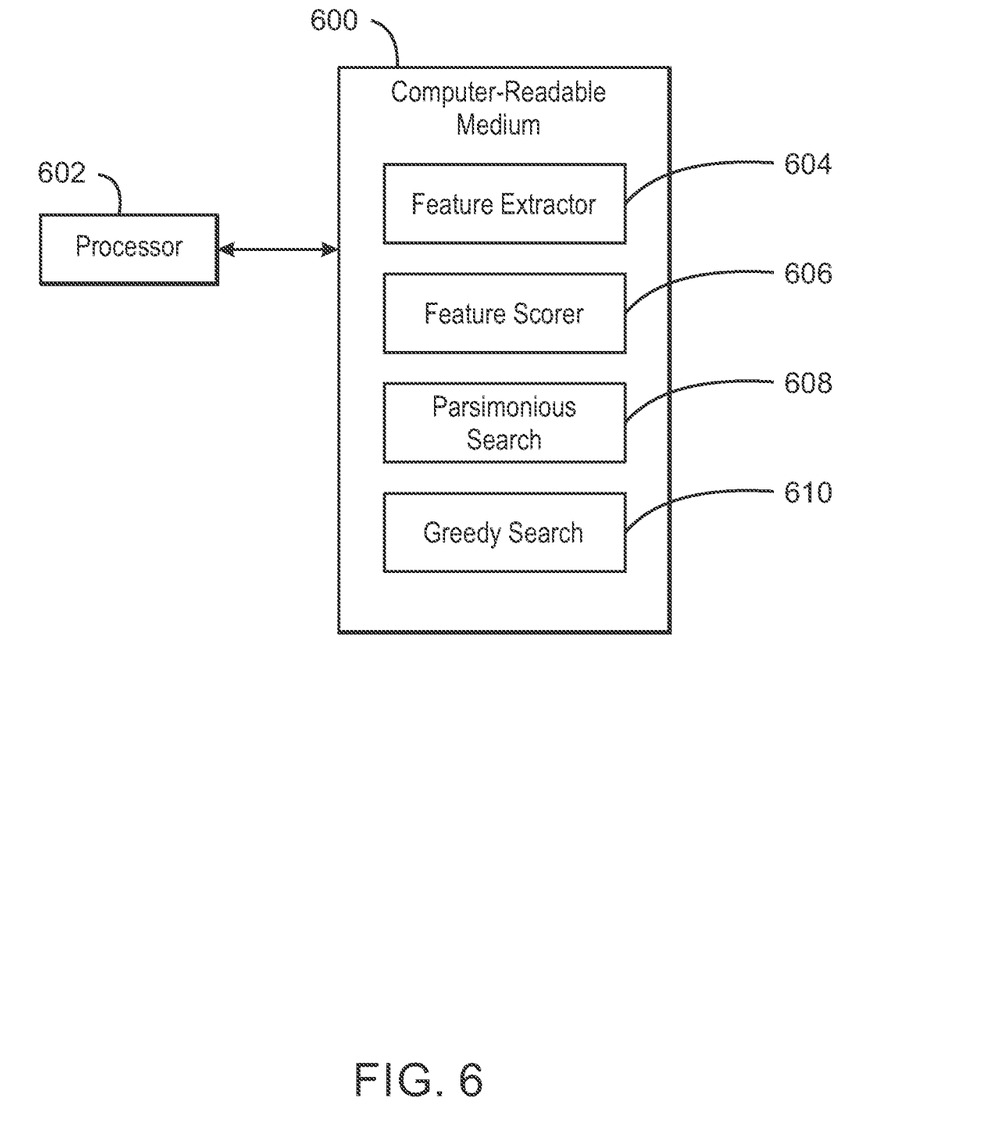
FIG. 6 is a block diagram of an exemplary non-transitory, machine-readable medium 600 including code to direct a processor 602 to identify matching records in a data set.

FIG. 6 is a block diagram of an exemplary non-transitory, machine-readable medium 600 including code to direct a processor 602 to identify matching records in a data set. The processor 602 may access the non-transitory, machine-readable medium 600 over a bus 604. The non-transitory, machine-readable medium 600 may include devices described for the mass storage 508 of FIG. 5, or may include optical disks, thumb drives, or any number of other hardware devices.

The machine-readable medium 600 can include a feature extractor 604, a feature scorer 606, a parsimonious search module 608, and a greedy search nodule 610. The feature extractor 604 is configured to identify a set of features of a target record and assign a scoring metric to each feature in the set of features. The feature scorer 606 is configured to process the set of features based on the scoring metric to obtain a reduced subset of features and an expanded subset of features. The parsimonious search module 608 is configured to search the set of electronic records using the reduced subset of features to obtain a reduced subset of electronic records. The greedy search module 610 is configured to search the reduced subset of electronic records using the expanded subset of features to obtain a set of matching electronic records.

The block diagram of FIG. 6 is not intended to indicate that the medium 600 is to include all of the modules shown. Further, the medium 600 may include any number of additional modules not shown in FIG. 6, depending on the details of the specific implementation. For example, the machine-readable medium 600 can include code to generate a graphical user interface that enables a user to interact with the system to perform searches and view results. The machine-readable medium 600 can also include code to grant access to computer resources based on the identification of matching user credentials.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the scope of the present techniques.

What is claimed is:

1. A method of classifying records, comprising:
receiving a target record;
identifying a set of features of the target record and assigning a scoring metric to each feature in the set of features;
processing the set of features based on the scoring metric to obtain a reduced subset of features and an expanded subset of features, wherein the expanded subset of features includes the reduced subset of features;
searching a store of electronic records using the reduced subset of features to obtain a reduced subset of electronic records; and
searching the reduced subset of electronic records using the expanded subset of features to obtain a set of matching electronic records.

2. The method of claim 1, wherein the target record is a fingerprint and the set of features are minutiae within the fingerprint.

3. The method of claim 2, wherein the scoring metric describes a quality of each of the minutiae individually.

4. The method of claim 1, wherein the target record is a text document and the set of features are words in the text document.

5. The method of claim 4, wherein the scoring metric describes a frequency with which each word appears in the text document.

6. A system to classify records, comprising:
a processor;
a memory device comprising instructions that are executable by the processor;
a storage device to store a set of electronic records; and
an interface to receive a target record;
wherein the instructions, when executed, direct the processor to:
identify a plurality of features in the target record and assign a scoring metric to each one of the plurality of features;
identify a subset of the plurality of features that have a scoring metric above a specified threshold value;
search the set of electronic records using the subset of the plurality of features to obtain a reduced subset of electronic records; and
search the reduced subset of electronic records using the plurality of features to obtain a set of matching electronic records, wherein the plurality of features includes the subset of the plurality of features that have the scoring metric above the specified threshold value.

7. The system of claim 6, wherein the target record is a fingerprint and the set of features are minutiae within the fingerprint.

8. The system of claim 7, wherein the scoring metric describes a quality of each of the minutiae individually.

9. The system of claim 6, wherein the target record is a text document and the set of features are words in the text document.

10. The system of claim 9, wherein the scoring metric describes a frequency with which each word appears in the text document.

11. A tangible, non-transitory, computer-readable medium comprising instructions that, when executed by a processor, direct the processor to:
   identify a plurality of minutiae of a target fingerprint and assign a scoring metric to each minutia;
   process the plurality of minutiae based on the scoring metric to obtain a reduced subset of minutiae and an expanded subset of minutiae, wherein the expanded subset of minutiae includes the reduced subset of minutiae;
   search a database of candidate fingerprints using the reduced subset of minutiae to obtain a reduced subset of candidate fingerprints from the database; and
   search the reduced subset of candidate fingerprints using the expanded subset of minutiae to identify one or more matching fingerprints.

12. The computer-readable medium of claim 11, wherein the scoring metric describes a quality of each of the minutiae individually.

13. The computer-readable medium of claim 11, wherein the reduced subset of minutiae comprises minutiae that have a scoring metric above a specified threshold value.

14. The computer-readable medium of claim 11, wherein the reduced subset of minutiae comprises a specified number of minutiae that have a highest value for the scoring metric.

15. The computer-readable medium of claim 11, comprising instructions that enable a user access to a computer resource upon identification of a matching fingerprint.

* * * * *